United States Patent
Satuloori et al.

(10) Patent No.: US 7,363,612 B2
(45) Date of Patent: Apr. 22, 2008

(54) APPLICATION PROGRAMS WITH DYNAMIC COMPONENTS

(75) Inventors: Sridhar Satuloori, Nalgonda (IN); Hanumantha Rao Susarla, Bangalore (IN); Madhurabaratula Srinivas Ramprasad, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 666 days.

(21) Appl. No.: 10/092,168

(22) Filed: Mar. 6, 2002

(65) Prior Publication Data

US 2003/0172370 A1 Sep. 11, 2003

(51) Int. Cl.
*G06F 9/44* (2006.01)
*G06F 9/46* (2006.01)
*G06F 15/00* (2006.01)

(52) U.S. Cl. .................. 717/107; 717/108; 717/111; 719/315; 715/513

(58) Field of Classification Search .............. 707/10, 707/103 R, 1; 717/126, 143, 153, 106, 104, 717/120, 107, 108, 111; 719/328, 315; 705/38; 715/513, 700; 709/218
See application file for complete search history.

(56) References Cited

U.S. PATENT DOCUMENTS

| | | | |
|---|---|---|---|
| 5,848,274 A * | 12/1998 | Hamby et al. ............... 717/153 |
| 6,085,198 A * | 7/2000 | Skinner et al. .......... 707/103 R |
| 6,523,172 B1 * | 2/2003 | Martinez-Guerra et al. . 717/143 |
| 6,643,652 B2 * | 11/2003 | Helgeson et al. ............. 707/10 |
| 6,681,383 B1 * | 1/2004 | Pastor et al. ................. 717/126 |
| 6,754,659 B2 * | 6/2004 | Sarkar et al. .................. 707/10 |
| 6,766,324 B2 * | 7/2004 | Carlson et al. ............... 707/10 |
| 7,080,350 B2 * | 7/2006 | Saimi et al. ................. 717/100 |
| 2002/0104067 A1 * | 8/2002 | Green et al. ................. 717/101 |
| 2002/0109734 A1 * | 8/2002 | Umezu et al. ............... 345/846 |
| 2002/0194388 A1 * | 12/2002 | Boloker et al. ............. 709/310 |
| 2003/0023953 A1 * | 1/2003 | Lucassen et al. ........... 717/106 |
| 2003/0041180 A1 * | 2/2003 | Schlussman ................. 709/328 |
| 2003/0056022 A1 * | 3/2003 | Carlson et al. ............. 709/315 |
| 2003/0115548 A1 * | 6/2003 | Melgar ........................ 715/513 |
| 2003/0163412 A1 * | 8/2003 | Monlux et al. ................ 705/38 |
| 2003/0163603 A1 * | 8/2003 | Fry et al. ..................... 709/328 |
| 2003/0172368 A1 * | 9/2003 | Alumbaugh et al. ......... 717/106 |

OTHER PUBLICATIONS

"Model View Controller," downloaded from http:object-arts.com/EducationCentre/Overviews/MVC.htm on Jan. 15, 2002, 3 pages.

(Continued)

*Primary Examiner*—Li B Zhen
(74) *Attorney, Agent, or Firm*—Robert C. Kowert; Meyertons, Hood, Kivlin, Kowert & Goetzel, P.C.

(57) ABSTRACT

An application program may include application modules. One or more of the application modules may each include a dynamic component and static component. The dynamic components and the static components may be configured to function according to an initial set of requirements for the application. A dynamic component generator may receive a new set of requirements for the application and generate updated dynamic components to replace the current dynamic components. The updated dynamic components may be configured to function according to the new set of requirements.

44 Claims, 7 Drawing Sheets

OTHER PUBLICATIONS

Model-View-Controller Architecture, Copyright 2001 Sun Microsystems, 3 pages.

"Enterprise JavaBeans 2.0 Container-Managed Persistence Example," Beth Stearns, Sun Microsystems, Inc. Jul. 2001, 14 pages.

"3The Model-View-Controller Architecture," downloaded from rd13doc.cern.ch/Atlas/Notes/004/Note004-7.html on Jan. 15, 2002, ATD—Aug. 30, 1996, 3 pages.

* cited by examiner

APPLICATION PROGRAMS WITH DYNAMIC COMPONENTS

BACKGROUND OF THE INVENTION

1. Field of the Invention

The present invention relates to the field of computer application programs, and more particularly to systems and methods for dynamically changing an application program in response to changes in requirements for the application.

2. Description of the Related Art

A developer may desire to update a computer application as use of the application evolves. The application's requirements may change as the use of the application evolves. The applications may have to be modified to reflect the change in requirements. For example, a business may expand, and the business may desire to add a product line. The business may desire to access details of the new product line through the business's enterprise resource planning applications.

The cost of implementing the changes may be significant. Developers may have to perform manually modify the application. Tight coupling of data and logic in the application's design may hinder manual modification efforts. The user and/or administrator of the application may have to change properties of the application. However, settable properties may have a very limited impact on functionality. The application may become obsolete if the changes in requirements are significant.

Typical software design paradigms may not allow an application to change over time. The model-view-controller (MVC) architecture is an example of such a typical software design paradigm. The MVC architecture is a software design paradigm facilitating code re-use. The MVC architecture may include separating an application into three functional modules: a model module, a view module, and a controller module. The model module may perform transformations on data. The view module may include presentation logic for displaying data and may query the model module to obtain the data. The controller module may include the details of user interface interaction. The controller module and the view module may access each other's methods. However, the modules of the MVC architecture may remain dependent on data representation and business logic. Thus, the cost of implementing changes in enterprise data representation and/or business logic may remain significant.

Typical software design paradigms may not separate applications into static software components and dynamic software components. If application requirements change, such applications may require modifications. The modifications may consume significant resources.

SUMMARY OF THE INVENTION

An application program may include application modules. One or more of the application modules may each include a dynamic component and static component. The dynamic components and the static components may be configured to function according to an initial set of requirements for the application. A dynamic component generator may receive a new set of requirements for the application and generate updated dynamic components to replace the current components. The updated dynamic components may be configured to function according to the new set of requirements.

A method for installing an application with dynamic components on a system may include installing application modules each including a static component. An initial set of requirements for the application modules may be stored on a computer-accessible medium. A dynamic component generator may generate initial dynamic components for the application modules. The initial dynamic components may function according to the initial set of requirements. The dynamic component generator may receive a new set of requirements for the application modules and generate new dynamic components to replace the one or more initial dynamic components affected by the change in requirements. The new dynamic components may be configured to function according to the new set of requirements.

Another method for installing an application with dynamic components on a system may include installing application modules each including a static component. One or more of the application modules may include initial dynamic components. The dynamic components and the static components may function according to an initial set of requirements for the application. A dynamic component generator may receive a new set of requirements for the application modules and generate new dynamic components to replace the initial dynamic components affected by the change in requirements. The new dynamic component may function according to the new set of requirements.

Figure 1:
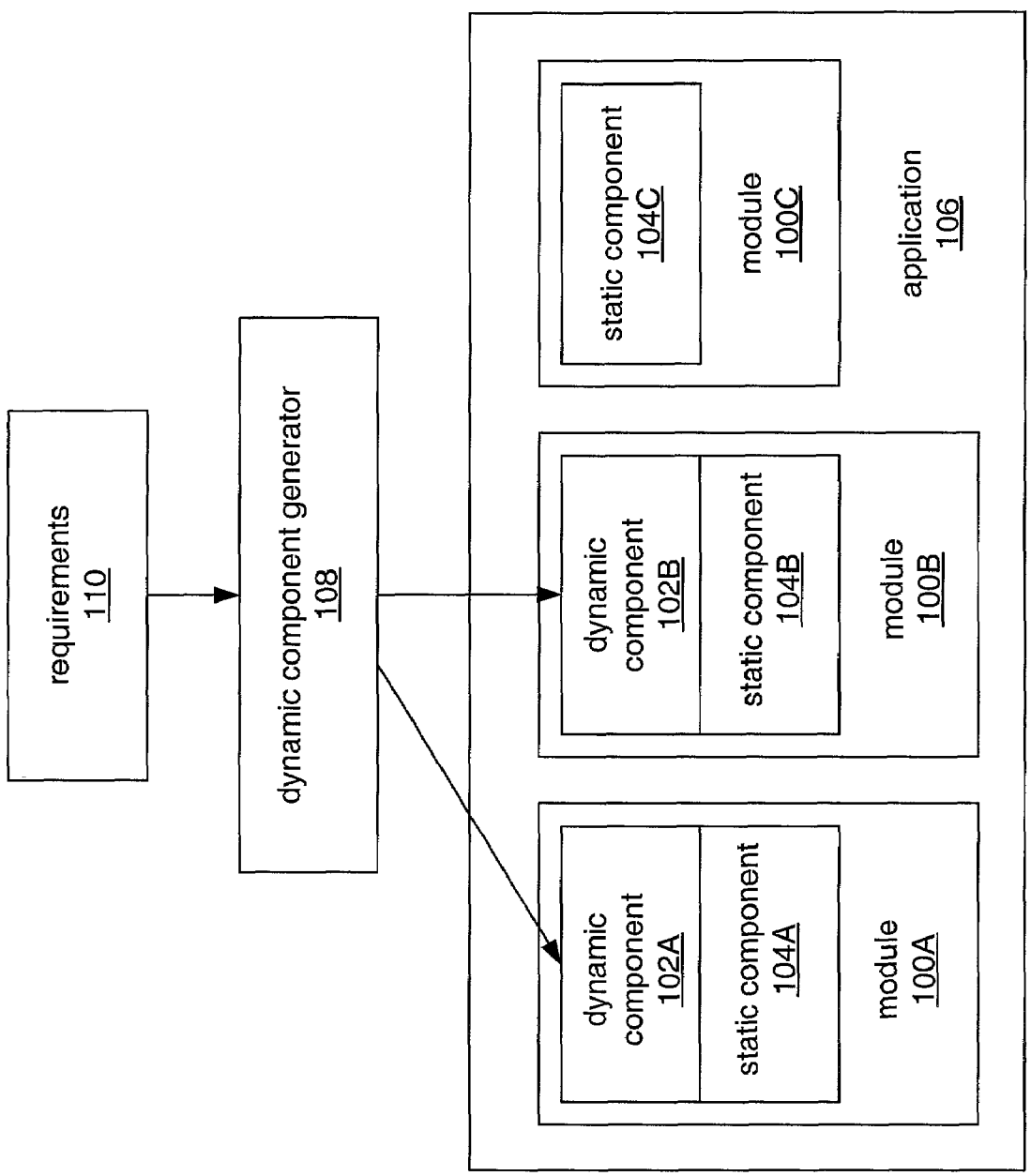
FIG. 1 illustrates an application with modules that a dynamic component generator may update to reflect a set of requirements according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

In one embodiment, an application may include both dynamic and static components. The dynamic components may be generated according to a set of requirements specified according to a schema and stored on a computer accessible medium. A dynamic component generator may be implemented to access the stored requirements and update one or more dynamic component if the stored requirements change. An administrator or developer may change the stored requirements if application requirements change. For example, a business may have an application with dynamic components. If the business expands to offer new products or services, the application requirements may change. The business may change the stored requirements for the applications dynamic components and one or more dynamic component generators may accordingly update the dynamic components of the application affected by the changes. The requirements may be formatted according to a schema understood by the generator(s).

In some embodiments, some applications may include static components. These components may typically not require modification when the application requirements are changed. For example, the static components may be user interface components. The dynamic component generator may not need to generate these components if data representation and/or business logic requirements change since the basic user interface may stay the same even when the underlying data representation and/or business logic of the application changes. The dynamic component generator may require less resources to generate components if some components are designated static than if all components are designated dynamic.

In one embodiment, a developer of a dynamic module generator may anticipate some changes in data representation and business logic of an enterprise application and not anticipate other changes in the data representation and business logic of the enterprise application. The dynamic module generator may implement an anticipated change. The dynamic module generator may also be general or powerful enough to implement some unanticipated changes. The dynamic module generator may not be able to implement other unanticipated changes.

FIG. 1 illustrates an application with modules that a dynamic component generator may update to reflect a set of requirements according to one embodiment. Application 106 may include modules 100A, 100B, and 100C among others. Application 106 may include modules that include both dynamic and static components such as modules 100A and 100B. Application 106 may include modules that have no dynamic components such as module 100C. In other embodiments, application 106 may include modules that have no static components but include dynamic components. Dynamic components 102A and 102B may include code that depends on application logic and/or data representations specified in requirements 110. Static components 104A, 104B, and 104C may not depend on requirements 110.

Dynamic component generator 108 may access requirements 110. Dynamic component generator 108 may be a module of application 106. In other embodiments, an application server container that contains application 106 may provide dynamic component generator 108 or it may be a stand-alone component. Requirements 110 may include specifications for application logic and data representation stored in a computer-accessible medium (e.g. a hard drive). In some embodiments, requirements 110 may be formatted according to an extensible Mark-up Language (XML) schema. In some embodiments, requirements 110 may be protected by security measures (e.g. password protected and/or encrypted) and may be updated by trusted individuals (e.g. administrators) only.

Dynamic component generator 108 may determine whether requirements 110 have changed and whether the change can be implemented. In some embodiments, there may be multiple dynamic component generators. In one embodiment, there may be a dynamic component generator for each module. Some changes may be unanticipated, and dynamic component generator 108 may be unable to implement the changes. If requirements 110 have changed, and the change can be implemented, then the dynamic component generator may update modules of application 106 that may be dependent on requirements 110 such as dynamic modules 102A and 102B. Dynamic component generator 108 may update dynamic components that the changes in requirements 110 affect.

In one embodiment dynamic component generator 108 may include a code generator configured to generate replacement or additional code module(s) according to a requirements input. The dynamic component generator 108 may be tailored for a specific application or type of application and for expected dynamic behavior (e.g. modifications in response to changing application requirements). In one embodiment, the dynamic component generator 108 may generate Java bytecode. The dynamic component generator 108 may leverage integrated development environment (DE) tools in some embodiments. In one embodiment, the dynamic component generator 108 may be provided as an extension of the Java 2 Enterprise Edition (J2EE) container functionality.

Dynamic component generator 108 may not update dynamic components that are not affected by the latest changes in requirements 110. In other embodiments, dynamic component generator may update all dynamic components. In some embodiments, if requirements 110 have changed, and the change cannot be implemented, dynamic component generator 108 may enter an error state and/or issue an error message. In one embodiment, static components are not changed.

In some embodiments, a modular application that includes dynamic components may be implemented according to a model-view-controller (MVC) architecture. One or more dynamic component generators may be implemented to update the modules of an MVC architecture application.

Figure 2:
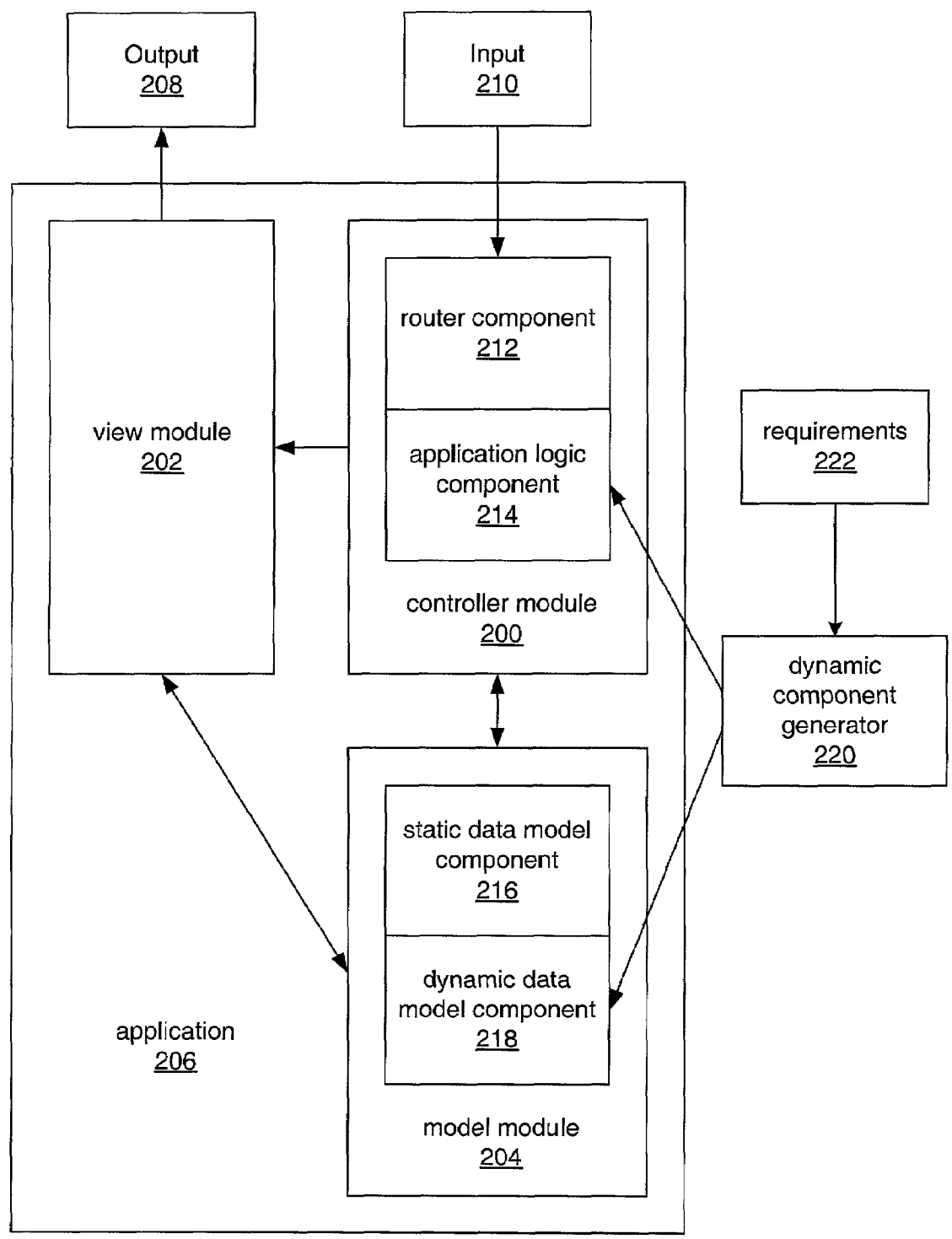
FIG. 2 illustrates a modular application with MVC architecture and a dynamic component generator according to one embodiment.

FIG. 2 illustrates a modular application with MVC architecture and a dynamic component generator according to one embodiment. Application 206 may include view module 202, controller module 200, and model module 204. In other embodiments application 206 may include other modules, fewer modules, additional modules, etc.

Dynamic component generator 220 may generate dynamic components included in modules of application 206 in response to changes in requirements 222. Dynamic component generator 220 may be included within an application server container for application 206. In other embodiments, dynamic component generator 220 may be included as a module of application 206 or as a separate component. Requirements 222 may be changed to reflect changes in an enterprise using application 206, for example. Requirements 222 may include specifications for application logic and data representation stored in a computer-accessible medium. In some embodiments, requirements 222 may be formatted according to an XML schema. In some embodiments, requirements 222 may be protected by security measures and may be updated by trusted individuals.

The dynamic components of application 206 may include code that depends on the application logic and data representation specified in requirements 222. Dynamic component generator 220 may update the dynamic components to reflect updated application logic and data representation specified in the latest version of requirements 222. Dynamic component generator 220 may update the dynamic components by overwriting them with new components. In other embodiments, dynamic component generator 220 may change portions of code in the dynamic components to reflect the changes in requirements 222. Other portions of the dynamic components may depend on unchanged portions of requirements 222.

View module 202 may query model module 204 and/or receive state updates from model module 204 to send display information to output 208. Output 208 may include a display device (e.g. a CRT monitor). View module 202 may receive display information from controller module 200 as well. In some embodiments view module 202 may include one or more components. In some embodiments application 206 may include one or more view modules such as view module 202.

Controller module 200 may receive interaction information from input 210. In some embodiments, input 210 may include input devices such as a keyboard and/or a mouse. In other embodiments, input 210 may be a session that passes application messages such as get and post for http sessions to controller module 200. Controller module 200 may translate the received interaction information into commands and data for model module 204 and view module 202 that may change the state.

Controller module 200 may include router component 212 and application logic component 214 among other components. Router component 212 may be a static component that receives input since the way that input data is processed may be largely independent of the application requirements. As requirements 222 change, router component 212 may remain static. Thus, router component 212 may include little or no code dependent on requirements 222. Application logic component 214 may be coupled to router component 212. Application logic component 214 may function according to application requirements specified in requirements 222 in response to input. Dynamic component generator 220 may update application logic component 214 in response to changes in requirements 222. In other embodiments, controller module 200 may include any number of static components and dynamic components. In some embodiments, controller module 200 or application logic component 214 may be implemented as an Enterprise Java Bean (EJB) session bean.

Model module 204 may use the commands and data from controller module 200 to generate new data or interact with existing data. Model module 204 may send data to view module 202. Model module 204 may include static data model component 216 and dynamic data model component 218. Static model component 216 may function independent of an application data representation specified in requirements 222 in response to the input from controller module 200. Dynamic data model component 218 may function dependent upon the application data representation according to a current set of application requirements in requirements 222 in response to the input from controller module 200. Dynamic component generator 220 may update dynamic data model component 218 in response to changes in requirements 222. In other embodiments, model module 204 may include any number of static components and dynamic components. In some embodiments, model module 204 may be implemented as an EJB entity bean. Thus, the model component may be partitioned into a component for the data model portion that is unlikely to need to be changed, and into a component for the data model portion that is likely to need to be changed.

Figure 3A:
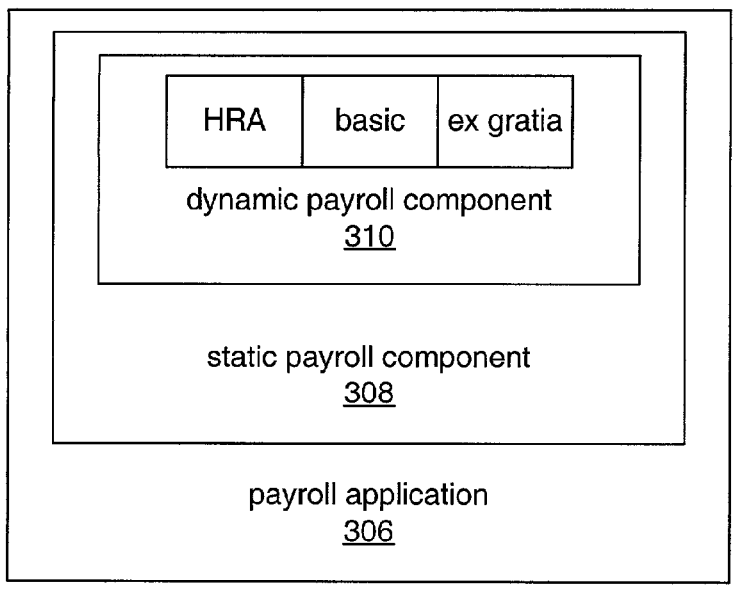
FIG. 3A illustrates a payroll application as an example of an application with a dynamic component generator according to one embodiment.
Figure 3B:
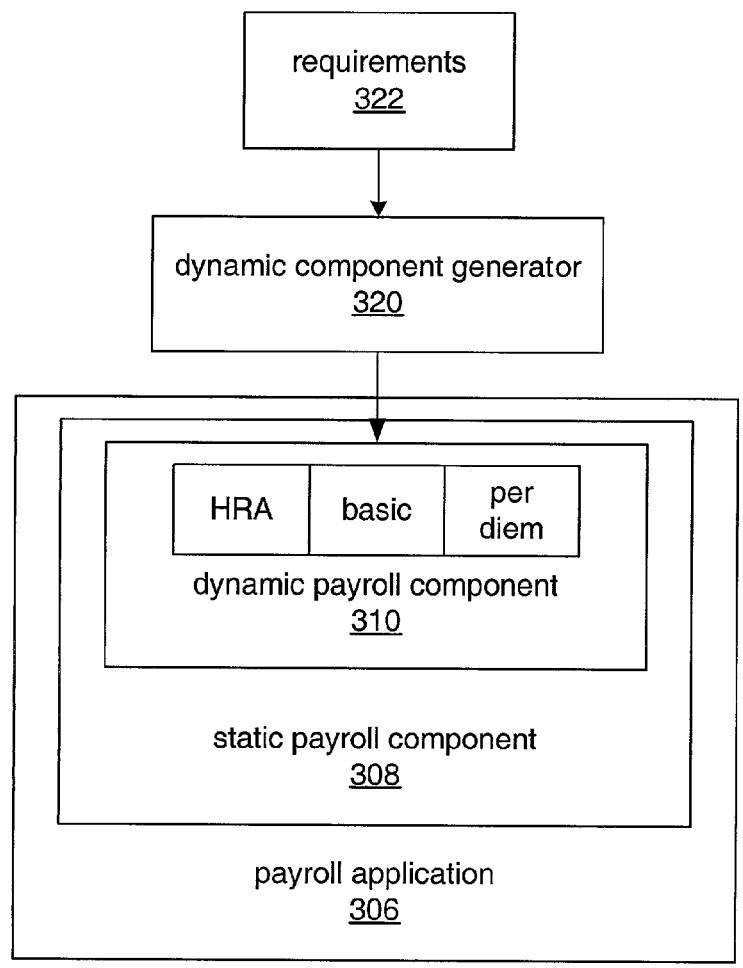
FIG. 3B illustrates a payroll application as an example of an application with a dynamic component generator according to one embodiment.

FIGS. 3A and 3B illustrate a payroll application as an example of an application with a dynamic component generator according to one embodiment. FIG. 3A illustrates payroll application 306 that may be a payroll management application implemented according to the MVC architecture. Payroll application 306 may be associated with a set of application requirements specifying logic and data representation. FIG. 3B illustrates requirements 322 that may include the specifications stored in a computer-accessible medium (e.g. a hard drive). Requirements 322 may be formatted according to a schema. The initial application requirements may specify that a payroll table include columns for each of basic pay, house rent allowance (HRA), and ex-gratia as data representation requirements. Initial application requirements may further specify that HRA and ex-gratia be calculated as a percentage of basic pay as logic requirements. Hence, requirements 322 may be a password protected text file on persistent storage and may indicate the following requirements, for example:

create payroll table with
columns basic, hra, exgratia
use hra=0.02*basic
use exgratia=0.01*basic Payroll application 306 may include static payroll component 308 that may not depend on requirements 322. Payroll 306 may include dynamic payroll component 310 that depends on requirements 322. Dynamic payroll component 310 may implement data structures defined by the data representation specification in requirements 322 and may generate data using the application logic specified by requirements 322.

If the data representation requirements and the logic requirements change to replace the ex-gratia component of the payroll with a per diem component calculated via a different formula, then requirements 322 may change to the following.

create payroll table with
columns basic, hra, perdiem
use hra=0.02*basic
use perdiem=0.05*basic+500

Dynamic component generator 320 may update dynamic payroll component 310 in response to the changes in requirements 322 as illustrated in FIG. 3B. Static payroll component 308 may remain unchanged.

Figure 4:
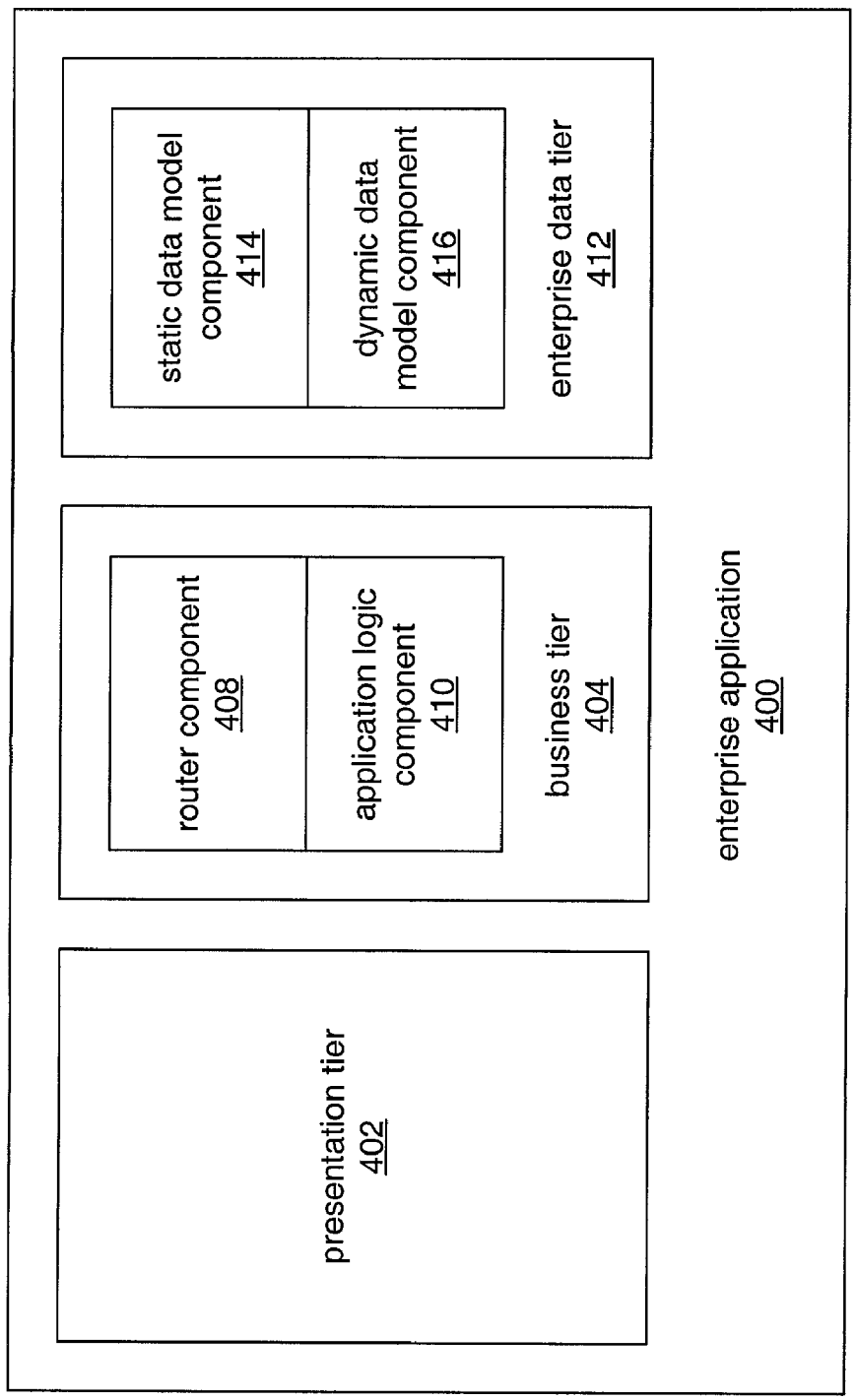
FIG. 4 illustrates a three-tier enterprise application with application logic and data representation components according to one embodiment.

In some embodiments, multi-tiered enterprise applications may include dynamic components. FIG. 4 illustrates a three-tier enterprise application with application logic and data representation components according to one embodiment. Enterprise application 400 may include presentation tier 402, business tier 404, and enterprise data tier 412. In some embodiments, enterprise application 400 may satisfy the MVC architecture with presentation tier 402 as a view module, business tier 404 as a controller module, and enterprise data tier 412 as a model module. Presentation tier 402 may include code for providing content that may not be dependent on specified application requirements. The specified application requirements may include application logic requirements and data representation requirements formatted according to an XML schema and stored in a computer-accessible medium such as a hard drive. For example, the stored requirements may be as follows.

```
<Requirements File>
    <Data>
        <AccountTable>
            <action >create</action>
            <columnName name="a/c no" options . . . />
            < columnName name="Amount" options . . . />
            . . .
            < columnName name="Transaction No." options . . . />
        </AccountTable>
    </ Data>
    <Model>
        <action > generate a bean</action>
        <type>Entity bean</type>
        <mapping table ="RD-Table">
        <implementor Class> RdEntityBean</ implementor Class>
        . . .
    </Model>
    <Business>
        <component methodName="Balance" type="session bean">
        BalanceSessionBean</component>
        <action>recompute</action>
        <newcomp> CA+SA+FD+RD</newcomp>
    </Business>
</Control Schema File>
```

Business tier 404 and enterprise data tier 412 may include components dependent on the stored requirements. Business tier 404 may include router component 408. Router component 408 may be a static component that handles input to the application routing it to the appropriate modules. Business tier 404 may include application logic component 410 for processing input from router component 408. Application logic component 410 may depend on application logic requirements specified in the XML schema.

For example, from the XML example above, enterprise application 404 may be a banking application and business tier 404 may implement the section tagged <Business>. In this example, application logic component 410 implements <newcomp> CA+SA+FD+RD </newcomp> to total the funds in each of a checking account (CA), a savings account (SA), a fixed deposit account (FD), and a recurring deposit account (RD) for a customer. If the bank added credit-on-demand accounts (CRED), the <newcomp> section may be updated to be <newcomp>(CA+SA+FD+RD)-CRED </newcomp>. A dynamic component generator may then implement this change by updating application logic component 410.

Enterprise data tier 412 may include enterprise data component 414 and data model component 416. Static data model component 414 may include code for managing data models that may not change over time (e.g. a fixed-point monetary format). Static data model component 414 may remain the same as the stored requirements change. Enterprise data tier 412 may include dynamic data model component 416. Dynamic data model component 416 may manage data models dependent on the stored requirements. If the stored requirements change, a dynamic component generator may update dynamic data model component 416 to reflect the changes.

From the above example, dynamic data model component 416 may implement the section tagged <Data> and <Model>. That is, dynamic data model may implement and manage tables for the various types of accounts. If the bank added credit-on-demand accounts, the <Data> section of the stored requirements may be updated. A dynamic component generator may update dynamic data model 416 to manage the credit-on-demand accounts.

Enterprise application 400 may be implemented using Java 2, Enterprise Edition. Enterprise (J2EE) application 400's modules may be implemented according to Enterprise JavaBeans. Business tier 404 may be implemented as a Session JavaBean, and enterprise data tier 412 may be implemented as an Entity JavaBean, for example. Application logic component 410 may use container-managed relationships to implement application logic requirements. Enterprise data tier 412 may use container-managed persistence to manage the mapping of fields from the tables. In some embodiments of a J2EE implementation, an application server container may include dynamic component generators.

Figure 5:
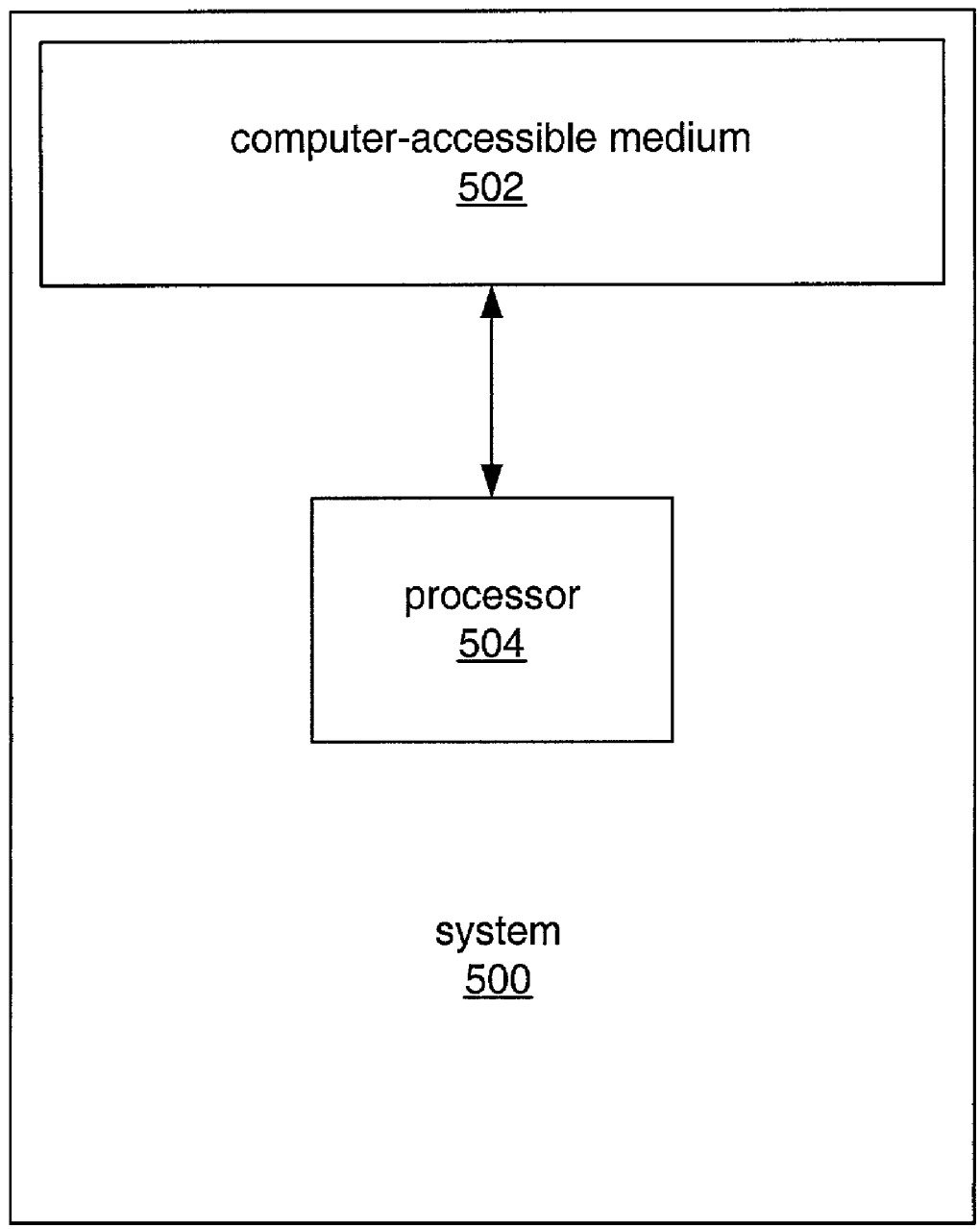
FIG. 5 illustrates a system including a processor and a computer-accessible medium according to one embodiment.

FIG. 5 illustrates a typical computer system 500 that is suitable for implementing various embodiments of the system and method for dynamically changing an application program in response to changes in requirements for the application. Each computer system 500 typically includes components such as a processor 504 with an associated computer-accessible medium 502. Processor 504 may include one or more processors, such as a Sparc, X86 (Pentium), PowerPC, or Alpha processor. Computer-accessible medium 502 may store program instructions for computer programs, wherein the program instructions are executable by processor 504. Computer system 500 may further include a display device such as a monitor, an alphanumeric input device such as a keyboard, and a directional input device such as a mouse. Computer system 500 is operable to execute the computer programs to implement dynamically changing an application program in response to changes in requirements for the application.

Computer system 500 preferably includes a computer-accessible medium on which computer programs according to various embodiments may be stored. The term "computer-accessible medium" may include an installation medium, e.g., a CD-ROM, DVD or floppy disks, a computer system memory such as DRAM, SRAM, EDO DRAM, SDRAM, DDR SDRAM, Rambus RAM, etc., or a non-volatile memory such as a magnetic media, e.g., a hard drive, or optical storage. The computer-accessible medium may include other types of memory as well, or combinations thereof. In addition, the computer-accessible medium may be located in a first computer in which the programs are executed, or may be located in a second different computer that connects to the first computer over a network. In the latter instance, the second computer provides the program instructions to the first computer for execution. The instructions and/or data according to various embodiments may also be transferred upon a carrier medium. In some embodiments, a computer readable medium may be a carrier medium such as a network and/or a wireless link upon which signals such as electrical, electromagnetic, or digital signals may be conveyed.

Also, computer system 500 may take various forms, including a personal computer system, mainframe computer system, workstation, network appliance, Internet appliance, personal digital assistant (PDA), set-top box, television system or other device. In general, the term "computer system" can be broadly defined to encompass any device having a processor that executes instructions from a computer-accessible medium.

The computer-accessible medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host processor 504, executing code and data from the memory medium includes a means for creating and executing the software program or programs according to the methods and/or block diagrams described below.

In one embodiment, the computer programs executable by the computer system 500 may be implemented in an object-oriented programming language. In an object-oriented programming language, data and related methods can be grouped together or encapsulated to form an entity known as an object. All objects in an object-oriented programming system belong to a class, which can be thought of as a category of like objects that describes the characteristics of those objects. Each object is created as an instance of the class by a program. The objects may therefore be said to have been instantiated from the class. The class sets out variables and methods for objects that belong to that class. The definition of the class does not itself create any objects. The class may define initial values for its variables, and it normally defines the methods associated with the class (i.e., includes the program code which is executed when a method is invoked.) The class may thereby provide all of the program code that will be used by objects in the class, hence maximizing re-use of code which is shared by objects in the class.

Figure 6:
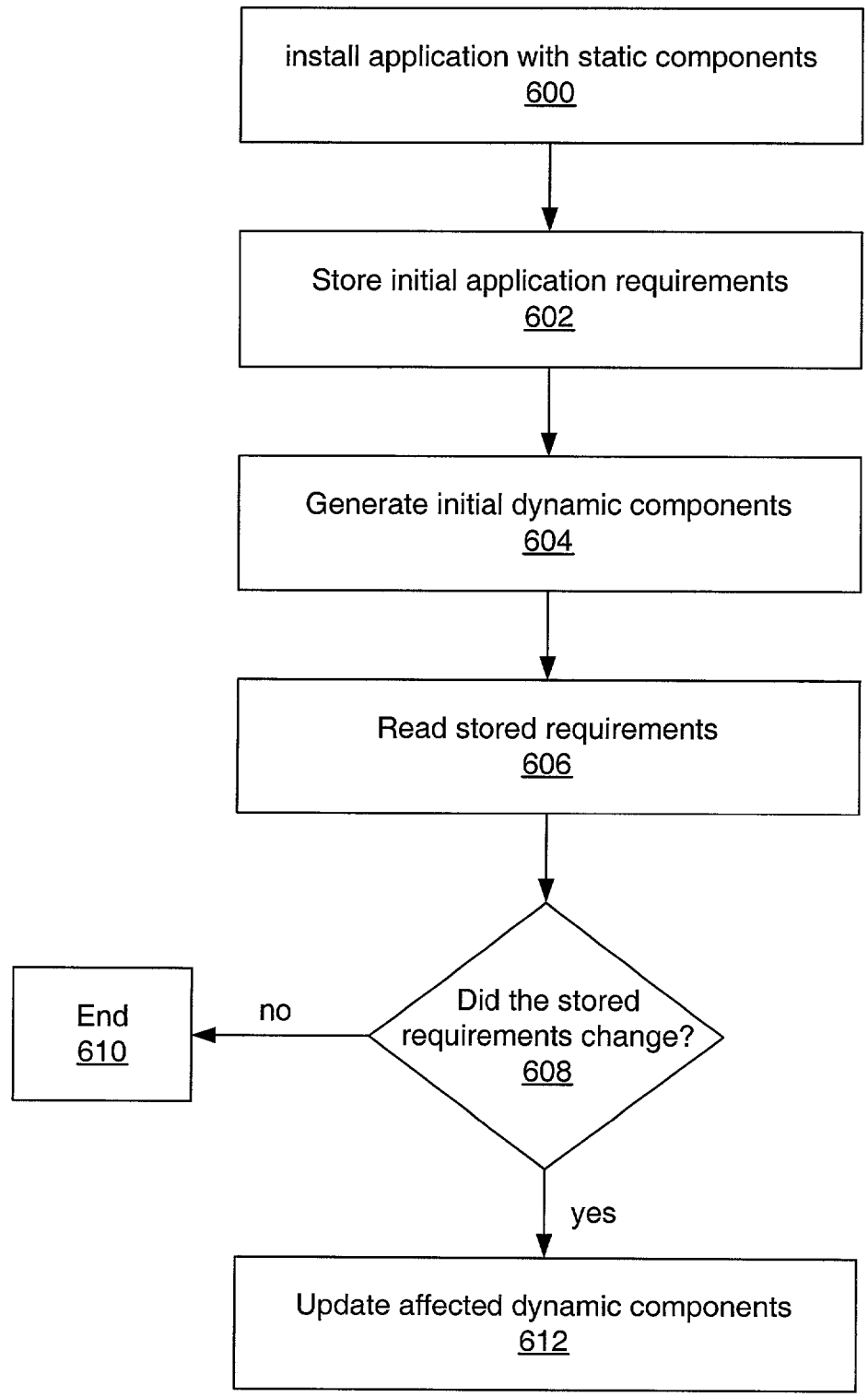
FIG. 6 illustrates a method for installing an application with a dynamic component generator according to one embodiment.

FIG. 6 illustrates a method for installing an application with a dynamic component generator according to one embodiment. An application including static components may be installed as indicated at 600. The application may include one or more dynamic component generators. In other embodiments, an application server container for the application may include one or more dynamic component generators. In some embodiments, one dynamic component generator may generate all of the application's dynamic components. In other embodiments, each dynamic component may have a dynamic component generator. Initial requirements may be stored on a computer-accessible medium as indicated at 602. The dynamic component generator(s) may read the initial requirements and generate the application's initial dynamic components based on the stored requirements' specifications as indicated at 604.

The stored requirements may be changed to reflect changing application requirements. The dynamic component generator(s) may read the stored requirements as indicated at 606. In some embodiments, the stored requirements may be formatted according to an XML schema and the dynamic component generator(s) may access an XML parser for reading the stored requirements. The dynamic component generator(s) may read the stored requirements every time the application is launched. In other embodiments, the dynamic component generator(s) may read the stored requirements in response to a system-level interrupt or other system-level signal (e.g. a cron process). The dynamic component generator(s) may determine whether the stored requirements have changed as indicated at 608. If the stored requirements have not changed, the dynamic components generator(s) may take no further action until the dynamic components generator(s) detect the next change in the stored requirements as indicated at 610. If the stored requirements have changed, then the dynamic components generator(s) may update the dynamic components affected by the change in requirements as indicated at 612. The dynamic components generator(s) may update the dynamic components by overwriting them. In other embodiments, the dynamic components generator(s) may update the dynamic components by patching each affected dynamic component's relevant code.

Figure 7:
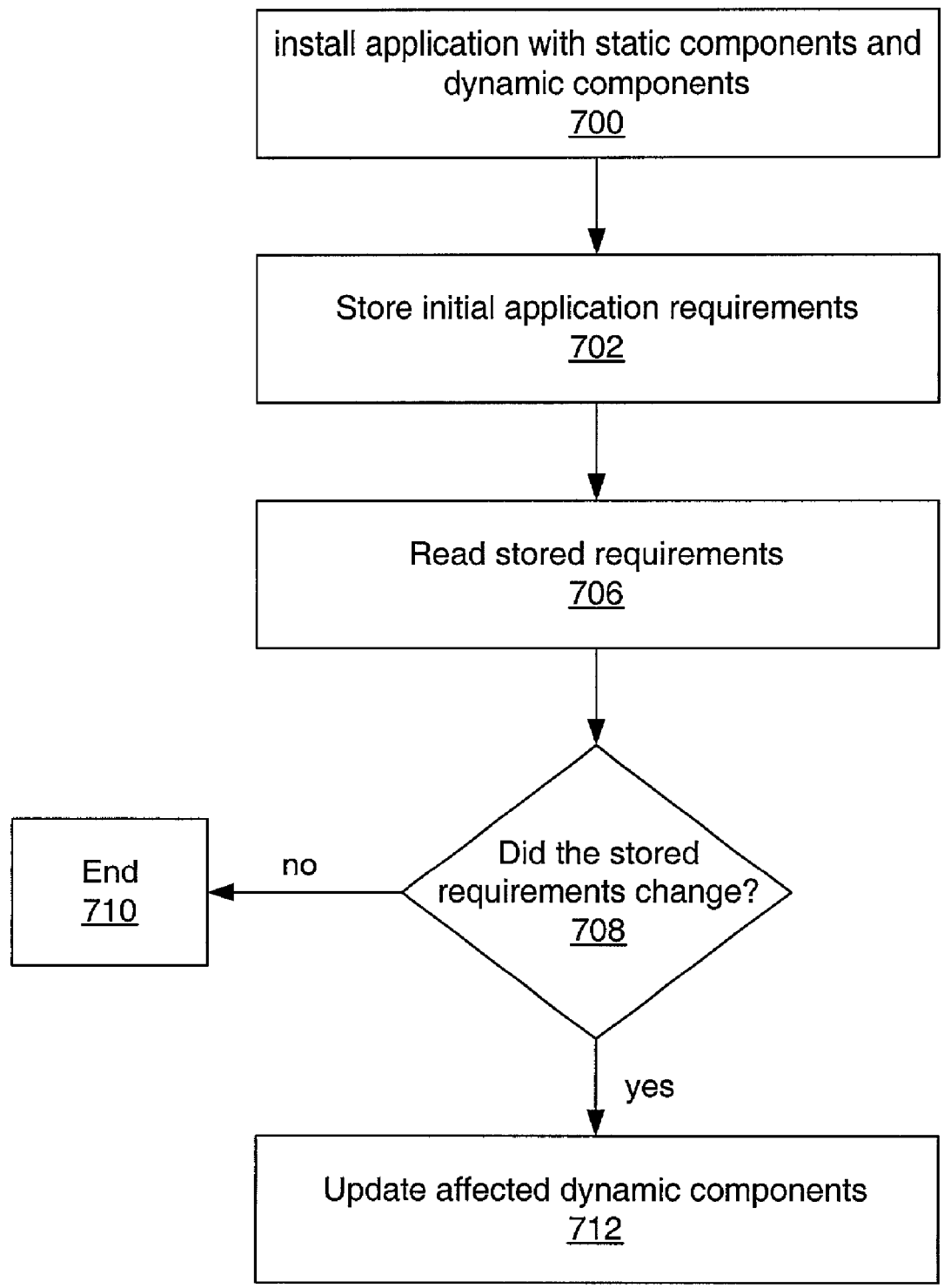
FIG. 7 illustrates a method for installing an application with a dynamic component generator according to one embodiment.

FIG. 7 illustrates a method for installing an application with a dynamic component generator according to one embodiment. The application may be installed with initial dynamic components as indicated at 700. The dynamic component generator(s) may not generate the initial dynamic components as in FIG. 6. If the requirements later change, the rest of the method is similar to the method of FIG. 6.

Note that the method described in FIGS. 6 and 7 are exemplary and not intended to be limiting. The methods may be implemented in software, hardware, or a combination thereof. The order of methods may be changed, and various elements may be added, reordered, combined, omitted, modified, etc.

Various embodiments may further include receiving, sending or storing instructions and/or data implemented in accordance with the foregoing description upon an article of manufacture such as a computer-accessible medium. Generally speaking, an article of manufacture may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor;
   a computer-accessible storage medium coupled to the processor, wherein the computer-accessible medium stores program instructions executable by the processor to implement an application program comprising:
      one or more application modules, wherein at least a first one of the application modules comprises a first dynamic component and a static component, wherein the first dynamic component and the static component are configured to function according to an initial set of requirements for the application; and
      a dynamic component generator configured to:
         receive a new set of requirements for the application;
         determine whether the new set of requirements includes changes from the initial set of requirements; and
         if the new set of requirements includes changes from the initial set of requirements, generate a second dynamic component to replace the first dynamic component in the application, wherein the second dynamic component is configured to function according to the new set of requirements;
      wherein the dynamic component generator is configured to generate the second dynamic component to replace the first dynamic component by modifying or overwriting the first dynamic component;
   wherein the first application module is a model module, wherein the static component is a static data model configured to function independent of an application data representation, and wherein the dynamic component is a dynamic data model configured to function dependent upon the application data representation and according to a current set of application requirements in response to the user input; and wherein the new set of requirements indicates a change to the application data representation, and wherein the dynamic component generator is configured to generate a new dynamic data model in response to the change to the application data representation.

2. The system as recited in claim 1, wherein the dynamic component generator does not change the static component in response to the new set of requirements.

3. The system as recited in claim 1, wherein the dynamic component generator is configured to generate the second dynamic component to replace the first dynamic component by modifying the first dynamic component in response to the new set of requirements.

4. The system as recited in claim 1, wherein the dynamic component generator is configured to replace the first dynamic component by overwriting the first dynamic component in the computer-accessible storage medium in response to the new set of requirements.

5. The system as recited in claim 1, wherein the new set of requirements is formatted according to an eXtensible Mark-up Language (XML) schema and stored in the computer-accessible storage medium.

6. The system as recited in claim 1, wherein the one or more application modules comprise a second application module comprising a static component and a dynamic component.

7. The system as recited in claim 6, wherein the dynamic component generator is configured to generate a new dynamic component for the second application module in response to receiving the new set of requirements.

8. The system as recited in claim 6, further comprising another dynamic component generator for the dynamic component of the second application module, wherein the other dynamic component generator is configured to generate a new dynamic component for the second application module in response to receiving a new set of requirements for the second application module.

9. The system as recited in claim 1, wherein the first application module is a controller module, wherein the static component is a router component configured to receive user input, and wherein the dynamic component is an application logic component coupled to the router component, wherein the application logic component is configured to function according to a current set of application requirements in response to the user input.

10. The system as recited in claim 9, wherein the application logic component comprises an Enterprise Java Bean (EJB) session bean.

11. The system as recited in claim 1, wherein the dynamic data model comprises an Enterprise Java Bean (EJB) entity bean.

12. A method, comprising:
    installing one or more application modules each comprising a static component;
    one or more dynamic component generators receiving an initial set of requirements for the application modules;
    the one or more dynamic component generators generating one or more initial dynamic components for the one or more application modules, wherein the one or more initial dynamic components are configured to function according to the initial set of requirements;
    receiving a new set of requirements for the application modules;
    determining whether the new set of requirements includes changes from the initial set of requirements; and
    if the new set of requirements includes changes from the initial set of requirements, generating one or more new dynamic components to replace the one or more initial dynamic components in the application modules, wherein the one or more new dynamic components are configured to function according to the new set of requirements, wherein said generating one or more new dynamic components comprises replacing the one or more initial dynamic components by the one or more new dynamic components by modifying or overwriting each of the one or more initial dynamic components;
    wherein one of the one or more application modules is a model module, wherein the static component is a static data model configured to function independent of an application data representation, and wherein a dynamic component generated for the one of the one or more application modules is a dynamic data model configured to function dependent upon the application data representation and according to a current set of requirements in response to the user input;
    wherein the method further comprises:
        receiving a new set of requirements indicating a change to the application data representation; and
        generating a new dynamic data model in response to the change to the application data representation.

13. The method as recited in claim 12, wherein said generating one or more new dynamic components comprises replacing the one or more initial dynamic components by the one or more new dynamic components by modifying the each of the one or more initial dynamic components in response to the new set of requirements.

14. The method as recited in claim 12, wherein said generating one or more new dynamic components comprises replacing the one or more initial dynamic components by the one or more new dynamic components by overwriting each of the one or more initial dynamic components in a computer-accessible storage medium in response to the new set of requirements.

15. The method as recited in claim 12, wherein the one or more dynamic component generators are comprised within the same application as the one or more application modules.

16. The method as recited in claim 12, wherein said generating is performed by one or more dynamic component generators comprised within an application server container, wherein the application modules are comprised within the same application server container.

17. The method as recited in claim 12, wherein, in said generating, the static components comprised by the one or more application modules are not changed in response to the new set of requirements.

18. The method as recited in claim 12, wherein the new set of requirements is formatted according to an eXtensible Mark-up Language (XML) schema.

19. The method as recited in claim 12, wherein one of the one or more application modules is a controller module, wherein the static component is a router component configured to receive user input, and wherein a dynamic component generated for the one of the one or more application modules is an application logic component coupled to the router component, wherein the application logic component is configured to function according to a current set of requirements in response to the user input.

20. The method as recited in claim 19, wherein the application logic component comprises an Enterprise Java Bean (EJB) session bean.

21. The method as recited in claim 12, wherein the dynamic data model comprises an Enterprise Java Bean (EJB) entity bean.

22. A method, comprising:
installing one or more application modules, wherein at least a first one of the application modules comprises a first dynamic component and a static component, wherein the first dynamic component and the static component are configured to function according to an initial set of requirements for the application;
one or more dynamic component generators receiving a new set of requirements for the application modules;
the one or more dynamic component generators determining whether the new set of requirements includes changes from the initial set of requirements; and
if the new set of requirements includes changes from the initial set of requirements, the one or more dynamic component generators generating a new dynamic component to replace the first dynamic component in the application modules, wherein the new dynamic component is configured to function according to the new set of requirements, wherein said generating comprises replacing the first dynamic component with the new dynamic component by modifying or overwriting the first dynamic component;
wherein the first application module is a model module, wherein the static component is a static data model configured to function independent of an application data representation, and wherein the dynamic component is a dynamic data model configured to function dependent upon the application data representation and according to a current set of application requirements in response to the user input; and
wherein the new set of requirements indicates a change to the application data representation, and wherein, in said generating, a new dynamic data model is generated in response to the change to the application data representation.

23. The method as recited in claim 22, wherein the one or more dynamic component generators are comprised within the same application server as the one or more application modules.

24. The method as recited in claim 22, wherein the one or more dynamic component generator are comprised within an application server container, wherein the one or more application modules are comprised within the same application server container.

25. The method as recited in claim 22, wherein, in said generating, the static component does not change in response to the new set of requirements.

26. The method as recited in claim 22, wherein, in said generating, the new dynamic component replaces the first dynamic component by modifying the first dynamic component in response to the new set of requirements.

27. The method as recited in claim 22, wherein, in said generating, the new dynamic component replaces the first dynamic component by overwriting the first dynamic component in a computer-accessible storage medium in response to the new set of requirements.

28. The method as recited in claim 22, wherein the new set of requirements is formatted according to an eXtensible Mark-up Language (XML) schema and stored in the computer-accessible storage medium.

29. The method as recited in claim 22, wherein the one or more application modules comprise a second application module comprising a static component and a dynamic component.

30. The method as recited in claim 29, further comprising generating a new dynamic component for the second application module in response to receiving the new set of requirements.

31. The method as recited in claim 22, wherein the first application module is a controller module, wherein the static component is a router component configured to receive user input, and wherein the dynamic component is an application logic component coupled to the router component, wherein the application logic component is configured to function according to a current set of application requirements in response to the user input.

32. The method as recited in claim 31, wherein the application logic component comprises an Enterprise Java Bean (EJB) session bean.

33. The method as recited in claim 22, wherein the dynamic data model comprises an Enterprise Java Bean (EJB) entity bean.

34. A tangible, computer-accessible storage medium, storing program instructions, wherein the program instructions are executable by a processor to implement an application program comprising:
one or more application modules, wherein at least a first one of the application modules comprises a first dynamic component and a static component, wherein the first dynamic component and the static component are configured to function according to an initial set of requirements for the application; and
a dynamic component generator configured to:
receive a new set of requirements for the application;
determine whether the new set of requirements includes changes from the initial set of requirements; and
if the new set of requirements includes changes from the initial set of requirements, generate a second dynamic component to replace the first dynamic component in the application, wherein the second dynamic component is configured to function according to the new set of requirements;
wherein the dynamic component generator is configured to generate the second dynamic component to replace the first dynamic component by modifying or overwriting the first dynamic component;
wherein the first application module is a model module, wherein the static component is a static data model configured to function independent of an application data representation, and wherein the dynamic component is a dynamic data model configured to function dependent upon the application data representation and according to a current set of application requirements in response to the user input; and
wherein the new set of requirements indicates a change to the application data representation, and wherein the dynamic component generator is configured to generate a new dynamic data model in response to the change to the application data representation.

35. The medium as recited in claim 34, wherein the dynamic component generator does not change the static component in response to the new set of requirements.

36. The medium as recited in claim 34, wherein the dynamic component generator is configured to generate the second dynamic component to replace the first dynamic component by modifying the first dynamic component in response to the new set of requirements.

37. The medium as recited in claim 34, wherein the dynamic component generator is configured to replace the first dynamic component by overwriting the first dynamic component in the computer-accessible medium in response to the new set of requirements.

38. The medium as recited in claim 34, wherein the new set of requirements is formatted according to an eXtensible Mark-up Language (XML) schema and stored in the computer-accessible medium.

39. The medium as recited in claim 34, wherein the one or more application modules comprise a second application module comprising a static component and a dynamic component.

40. The medium as recited in claim 39, wherein the dynamic component generator is configured to generate a new dynamic component for the second application module in response to receiving the new set of requirements.

41. The medium as recited in claim 39, further comprising another dynamic component generator for the dynamic component of the second application module, wherein the other dynamic component generator is configured to generate a new dynamic component for the second application module in response to receiving a new set of requirements for the second application module.

42. The medium as recited in claim 34, wherein the first application module is a controller module, wherein the static component is a router component configured to receive user input, and wherein the dynamic component is an application logic component coupled to the router component, wherein the application logic component is configured to function according to a current set of application requirements in response to the user input.

43. The medium as recited in claim 42, wherein the application logic component comprises an Enterprise Java Bean (EJB) session bean.

44. The medium as recited in claim 34, wherein the dynamic data model comprises an Enterprise Java Bean (EJB) entity bean.

* * * * *